(12) United States Patent
Wang et al.

(10) Patent No.: US 8,232,673 B2
(45) Date of Patent: Jul. 31, 2012

(54) POWER CONDITIONER AND METHOD OF MANAGING THE SAME

(75) Inventors: Yong Wang, Yongin-si (KR); Duk-jin Oh, Seoul (KR); See-young Choi, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 13/177,206

(22) Filed: Jul. 6, 2011

(65) Prior Publication Data

US 2011/0266866 A1    Nov. 3, 2011

Related U.S. Application Data

(62) Division of application No. 11/875,324, filed on Oct. 19, 2007, now Pat. No. 7,999,409.

(30) Foreign Application Priority Data

Apr. 17, 2007  (KR) .................................. 2007-37613

(51) Int. Cl.
*H02J 1/10* (2006.01)
(52) U.S. Cl. ............................................ 307/29; 307/17
(58) Field of Classification Search .................... 307/17, 307/29; 429/400, 428, FOR. 11
See application file for complete search history.

(56) References Cited

U.S. PATENT DOCUMENTS

| | | | |
|---|---|---|---|
| 6,128,744 A | 10/2000 | Wang et al. | |
| 6,218,744 B1 | 4/2001 | Zahrte et al. | |
| 7,449,259 B2 | 11/2008 | Zhu et al. | |
| 2003/0113595 A1* | 6/2003 | Jungreis | 429/13 |
| 2003/0228503 A1 | 12/2003 | Georgii | |
| 2004/0217732 A1 | 11/2004 | Zhu et al. | |
| 2004/0219399 A1 | 11/2004 | Zhu et al. | |
| 2006/0145542 A1 | 7/2006 | Kusubayashi | |
| 2007/0128482 A1* | 6/2007 | Gu et al. | 429/22 |
| 2008/0259660 A1 | 10/2008 | Wang et al. | |

FOREIGN PATENT DOCUMENTS

KR  10-2006-0106694  10/2006
KR  10-0641125  10/2006

OTHER PUBLICATIONS

U.S. Appl. No. 11/875,324, filed Oct. 19, 2007, Yong Wang et al., Samsung Electronics Co., Ltd.

* cited by examiner

*Primary Examiner* — Daniel Cavallari
(74) *Attorney, Agent, or Firm* — Stein McEwen, LLP

(57) ABSTRACT

A power conditioner includes a main converter to transform a voltage outputted from a power source into a first transformed voltage and output the first transformed voltage to supply power to a power using point; and an auxiliary converter to transform the first transformed voltage outputted from the main converter into a second transformed voltage and output the second transformed voltage to supply power to balance-of-plant (BOP) elements including driving devices of the power source. The main converter includes a first winding to transform the voltage outputted from the power source into the first transformed voltage and output the first transformed voltage to supply power to the power using point; and a second winding to transform the voltage outputted from the power source into a third transformed voltage and output the third transformed voltage to supply power directly to the BOP elements, thereby bypassing the auxiliary converter.

3 Claims, 6 Drawing Sheets

POWER CONDITIONER AND METHOD OF MANAGING THE SAME

CROSS-REFERENCE TO RELATED APPLICATIONS

This application is a divisional application of U.S. patent application Ser. No. 11/875,324, filed on Oct. 19, 2007, now U.S. Pat. No. 7,999,409, and claims the benefit of Korean Patent Application No. 10-2007-0037613 filed on Apr. 17, 2007, in the Korean Intellectual Property Office, the disclosures of which are incorporated herein by reference in their entirety.

BACKGROUND OF THE INVENTION

1. Field of the Invention

Aspects of the invention relate to a power conditioner for supplying power generated from a fuel cell or a solar cell to a power using point, and a method of managing the power controller.

2. Description of the Related Art

According to the related art, power generated by a fuel cell is supplied to a power using point through a power conditioner, as shown, for example, in FIG. 1. FIG. 1 shows a block diagram of a power conditioner disclosed in U.S. Patent Application Publication No. 2004/0219399 .Referring to FIG. 1, a direct current (DC) voltage of approximately 40 to 50V generated by a fuel cell 10 constituting a power source is boosted to a DC voltage of approximately 360 to 400V in a main converter 20. The fuel cell 10 has a structure in which a plurality of unit cells are stacked, and the DC voltage of 40 to 50V is outputted by adding together the voltage generated by each of the unit cells. The DC voltage boosted in the main converter 20 is transformed into an alternating current (AC) voltage in an inverter 30. The AC voltage is supplied to a power using point 40.

Power is required for controlling operations of various driving devices (blowers, motors, cooling fans, controllers, and the like), the main converter 20, and the inverter 30, and this power is provided by a DC voltage of approximately 20 to 30V that is obtained from an auxiliary converter 60. That is, a portion of the power boosted to the DC voltage of 360 to 400V in the main converter 20 is diverted to the auxiliary converter 60 to reduce the voltage to a DC voltage of approximately 20 to 30V, and the reduced voltage is supplied to the various driving devices, the main converter 20, and the inverter 30. The output voltage from the auxiliary converter 60 is also used for controlling the auxiliary converter 60. Elements in the fuel cell system that use a portion of the power generated by the fuel cell 10, such as controllers for controlling the main converter 20, the inverter 30, the auxiliary converter 60, and the various driving devices included in the fuel cell 10, are called balance-of-plant (BOP) elements 70. The term BOP elements will be used hereinafter to refer to these elements. The power conditioner also includes a battery 50 for use as a power source when a power supply to the auxiliary converter 60 is not stable, such as during an initial start-up mode of the fuel cell 10. The battery 50 is charged by the output voltage of the main converter 20 when the fuel cell 10 is in a normal operation mode, and is used as a power source for the auxiliary converter 60 when the fuel cell 10 is in an initial start-up mode. Power may also be supplied to the auxiliary converter 60 by connecting the auxiliary converter 60 to a source of household voltage, such as 110V or 220V, instead of using the battery 50. when the fuel cell 10 is operating in the initial start-up mode.

However, in the power conditioner described above, power to be supplied to the BOP elements 70 must pass through the main converter 20 and the auxiliary converter 60, resulting in an inevitable power loss due to the two voltage conversions that are performed. That is, as shown in the main converter 20 of FIG. 1, a voltage transformation proportional to a winding ratio between two windings W11 and W21 is performed. Power loss occurs during this voltage transformation because a portion of the power being transformed is converted into heat. In the same manner, a power loss occurs during the voltage transformation in the auxiliary converter 60. It is known that the power loss in the main converter 20 is approximately 10% and the power loss in the auxiliary converter 60 is approximately 20%. Accordingly, the power that is supplied to the BOP elements 70 after passing through the main converter 20 and the auxiliary converter 60 is approximately 70% or less of the power that is outputted from the fuel cell 10. In order to reduce the power loss, a portion of the power outputted from the fuel cell 10 can be directly supplied to the BOP elements 70 without passing through the main converter 20 and the auxiliary converter 60. However, the voltage outputted from the fuel cell 10 fluctuates according to the operating conditions of the fuel cell, that is, according to a load of the fuel cell 10. Accordingly, when the voltage outputted from the fuel cell 10 is directly supplied to the BOP elements 70, the operation of the overall system can be unstable.

In order to address the above problem, there is a need to develop a method of supplying stable power to the BOP elements 70 with a reduced power loss by reducing the number of voltage conversions that are performed.

SUMMARY OF THE INVENTION

To solve the above and/or other problems, aspects of the invention relate to a power conditioner that provides stable power to BOP elements with a reduced power loss, and a method of managing the power conditioner.

According to an aspect of the invention, a power conditioner includes a main converter to transform a voltage outputted from a power source into a first transformed voltage and output the first transformed voltage to supply power to a power using point; and an auxiliary converter to transform the first transformed voltage outputted from the main converter into a second transformed voltage and output the second transformed voltage to supply power to balance-of-plant (BOP) elements including driving devices for the power source; wherein the main converter includes a first winding to transform the voltage outputted from the power source into the first transformed voltage and output the first transformed voltage to supply the power to the power using point; and a second winding to transform the voltage outputted from the power source into a third transformed voltage and output the third transformed voltage to supply power directly to the BOP elements, thereby bypassing the auxiliary converter.

According to an aspect of the invention, the power conditioner may further include a first on/off switch in a first power supply line that supplies power to the BOP elements from the auxiliary converter; a second on/off switch in a second power supply line that supplies power directly to the BOP elements from the second winding; and a controller to control the first on/off switch and the second on/off switch to selectively provide power to the BOP elements from the auxiliary and the second winding.

According to an aspect of the invention, the power conditioner may further include a battery connected between the first winding and the auxiliary converter to store power and supply the stored power to the BOP elements through the auxiliary converter when the power source and the power conditioner are operating in an initial start-up mode.

According to an aspect of the invention, the first transformed voltage outputted from the main converter may be a direct current (DC) voltage; the power conditioner may further include an inverter connected between the main converter and the power using point to convert the direct current (DC) voltage outputted from the main converter into an alternating current (AC) voltage; and the power source may be a fuel cell or a solar cell.

According to an aspect of the invention, a method of operating a power conditioner is provided, the power conditioner including a main converter including a first winding to transform a voltage outputted from a power source into a first transformed voltage and output the first transformed voltage to supply power to a power using point, and a second winding to transform the voltage outputted from the power source into a second transformed voltage and output the second transformed voltage to supply power to balance-of-plant (BOP) elements of the power source, a battery connected to the first winding to store power outputted from the first winding and output a voltage, an auxiliary converter connected to the battery to transform the voltage outputted from the battery into a third transformed voltage to supply power to the BOP elements, a first on/off switch in a first power supply line that supplies power to the BOP elements from the auxiliary converter, a second on/off switch in a second power supply line that supplies power directly to the BOP elements from the second winding, and a controller to control the first on/off switch and the second on/off switch to selectively provide power to the BOP elements from the auxiliary converter and the second winding, the method including starting the power source; supplying power to the BOP elements only from the auxiliary converter by controlling the first on/off switch and the second on/off switch using the controller when the voltage outputted from the power source is unstable; and supplying power to the BOP elements only from the second winding, thereby bypassing the auxiliary converter, by controlling the first on/off switch and the second on/off switch using the controller when the voltage outputted from the power source is stable.

According to an aspect of the invention, the method may further comprise shutting down the power source and the power conditioner; and supplying power remaining in the power source to the BOP elements through only from the second winding, thereby bypassing the auxiliary converter, by controlling the first on/off switch and the second on/off switch using the controller when the BOP elements are required to operate during the shutting down of the power source and the power conditioner.

According to an aspect of the invention, the power source may be a fuel cell or a solar cell.

According to an aspect of the invention, a power conditioner includes a main converter connectable to a power source to convert a voltage outputted from the power source into a main voltage and a first auxiliary voltage different from the main voltage, output the main voltage to supply power to a power using point, and output the first auxiliary voltage to supply power to balance-of-plant (BOP) elements of the power source and the power conditioner; an auxiliary converter connected to the main converter to convert the main voltage outputted from the main converter into a second auxiliary voltage substantially equal to the first auxiliary voltage and output the second auxiliary voltage to supply power to the BOP elements; and a control circuit connected to the main converter, the auxiliary converter, and the BOP elements to selectively supply the first auxiliary voltage outputted from the main converter or the second auxiliary voltage outputted from the auxiliary converter to the BOP elements.

Additional aspects and/or advantages of the invention will be set forth in part in the description that follows and, in part, will be obvious from the description, or may be learned by practice of the invention.

BRIEF DESCRIPTION OF THE DRAWINGS

The above and/or other aspects and advantages of the invention will become apparent and more readily appreciated from the following description of embodiments of the invention, taken in conjunction with the accompanying drawings of which.

DETAILED DESCRIPTION OF THE EMBODIMENTS

Figure 1:
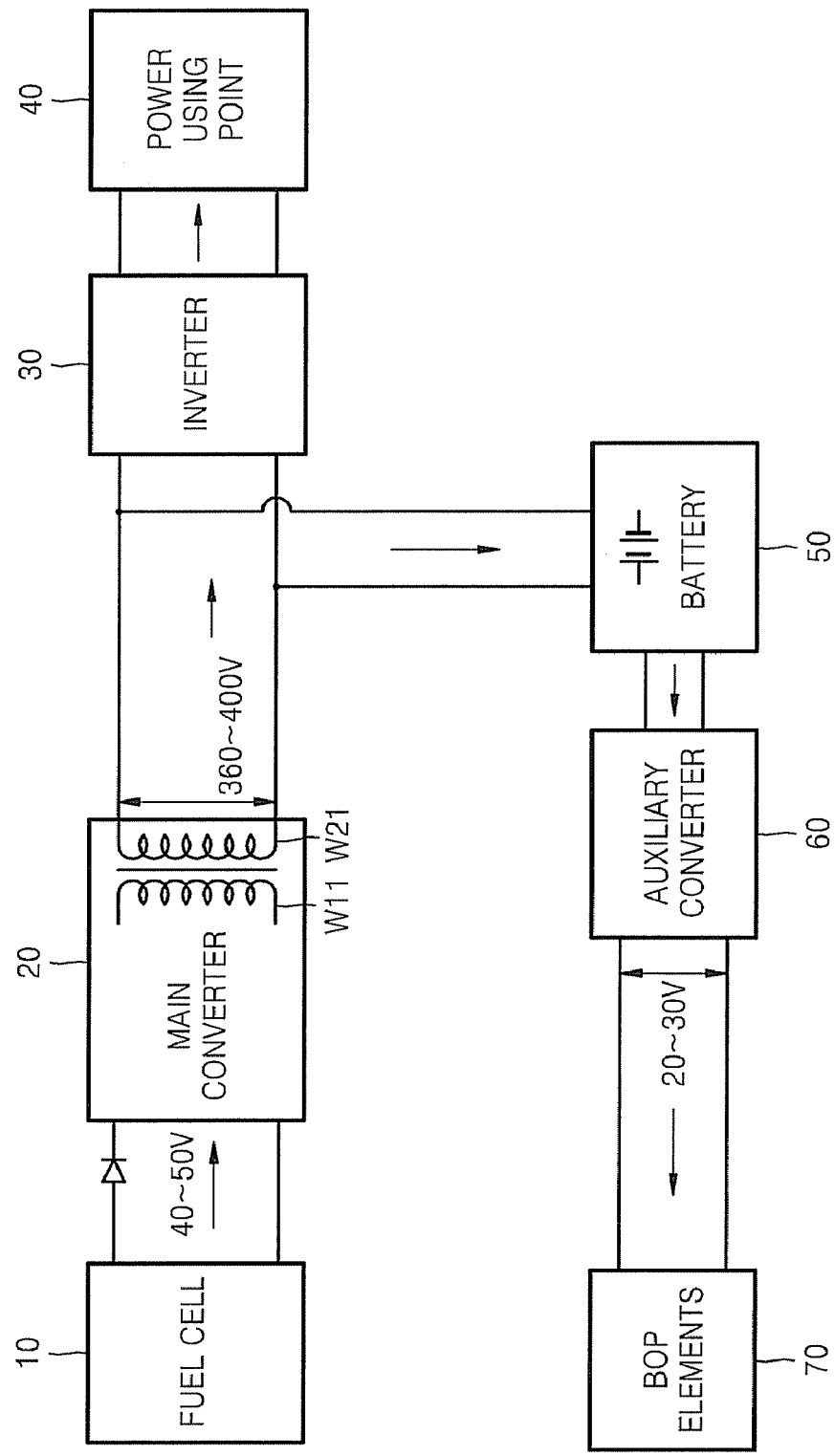
FIG. 1 is a block diagram of a power conditioner according to the related art.

Reference will now be made in detail to embodiments of the invention, examples of which are shown in the accompanying drawings, wherein like reference numerals refer to like elements throughout. The embodiments are described below in order to explain the invention by referring to the figures.

Figure 2:
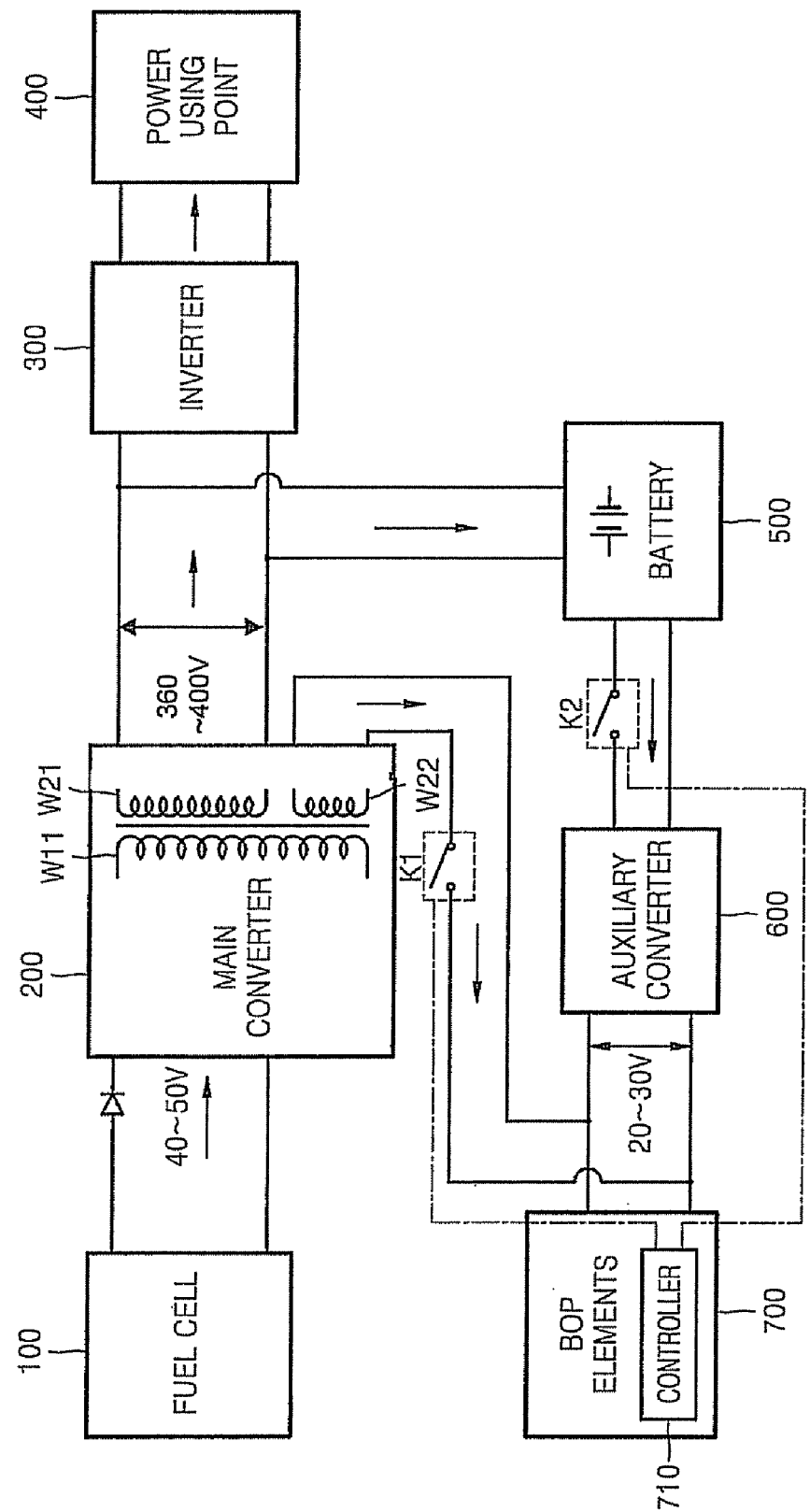
FIG. 2 is a block diagram of a power conditioner according to an aspect of the invention.

FIG. 2 is a block diagram of a power conditioner according to an aspect of the invention.

Referring to FIG. 2, a power conditioner according to an aspect of the invention has a basic configuration in which, after a DC voltage outputted from a power source, such as a stack of a fuel cell 100, is boosted in a main converter 200, the boosted DC voltage is supplied to a power using point 400 by converting the boosted DC voltage into an AC voltage in an inverter 300, and the boosted DC voltage outputted from the main converter 200 is reduced to a predetermined DC voltage and is supplied to BOP elements 700. Reference numeral 710 indicates a controller that controls the main converter 200, an auxiliary converter 600, and the inverter 300, and a first on/off switch K1 and a second on/off switch K2 that will be described later.

The power conditioner according to an aspect of the invention has a structure in which a voltage can be selectively supplied to the BOP elements 700, that is, a voltage reduced by the auxiliary converter 600, or a voltage directly reduced in the main converter 200, can be selectively supplied to the BOP elements 700. The main converter 200 includes an input winding W11 where power enters from the fuel cell 100, and a first output winding W21 and a second output winding W22 coupled to the input winding W11. The first winding W21 boosts a voltage of power outputted from the fuel cell 100 to a voltage that is suitable for supplying power to the power using point 400 like in the related art. Thus, a voltage of 40 to 50V outputted from the fuel cell 100 is boosted to a voltage of 360 to 400V by the first winding W21. The second winding W22 reduces the voltage of the power outputted from the fuel cell 100 to 20 to 30V to be suitable for supplying power to the BOP elements 700. Since the second winding W22 generates a voltage suitable for supplying power to the BOP elements 700, power outputted from the main converter 200 can be directly used for the BOP elements 700 without passing through the auxiliary converter 600. In this case, since the voltage supplied to the BOP elements 700 is transformed only once in the main converter 200, power loss in a transforming process can be reduced. However, when the fuel cell 100 is not in a normal operation mode, like when the fuel cell 100 is in an initial start-up mode, sufficient power cannot be supplied to the BOP elements 700 through the second winding W22. In this case, power stored in a battery 500 is supplied to the BOP elements 700 via the auxiliary converter 600 like in the related art. A controller 710 controls the first on/off switch K1 and the second on/off switch K2 to select a power supply line for supplying power to the BOP elements 700 from either a power supply line from the second winding W22 or a power supply line from the auxiliary converter 600. However, it is understood that any other power storage device, such as a capacitor, may be used instead of the battery 500.

Figure 4:
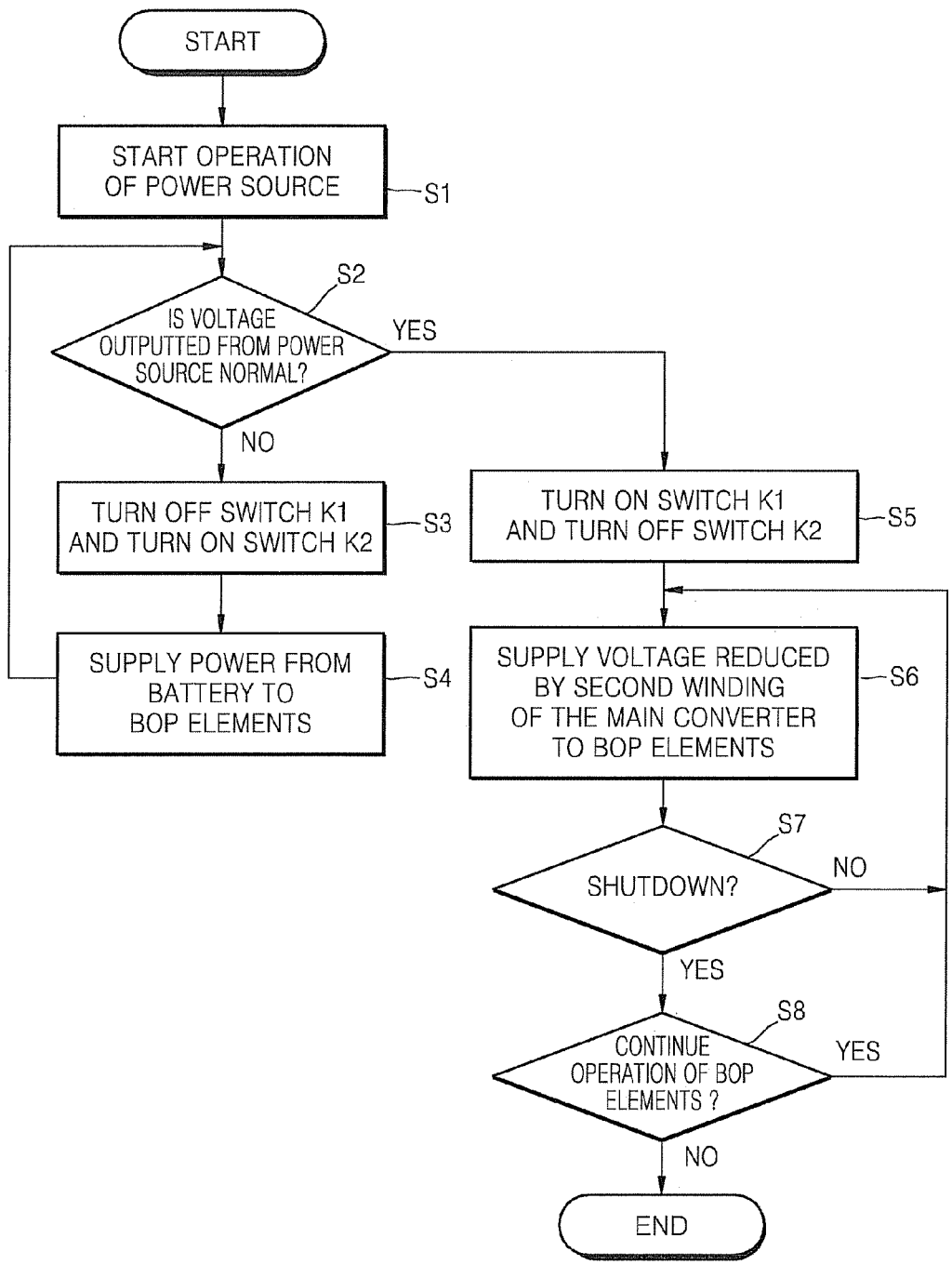
FIG. 4 is a flow chart of a method of managing the power conditioner of FIG. 2 according to an aspect of the invention.

The power conditioner according to an aspect of the invention having the above configuration can be managed according to the flow chart shown in FIG. 4.

Figure 3A:
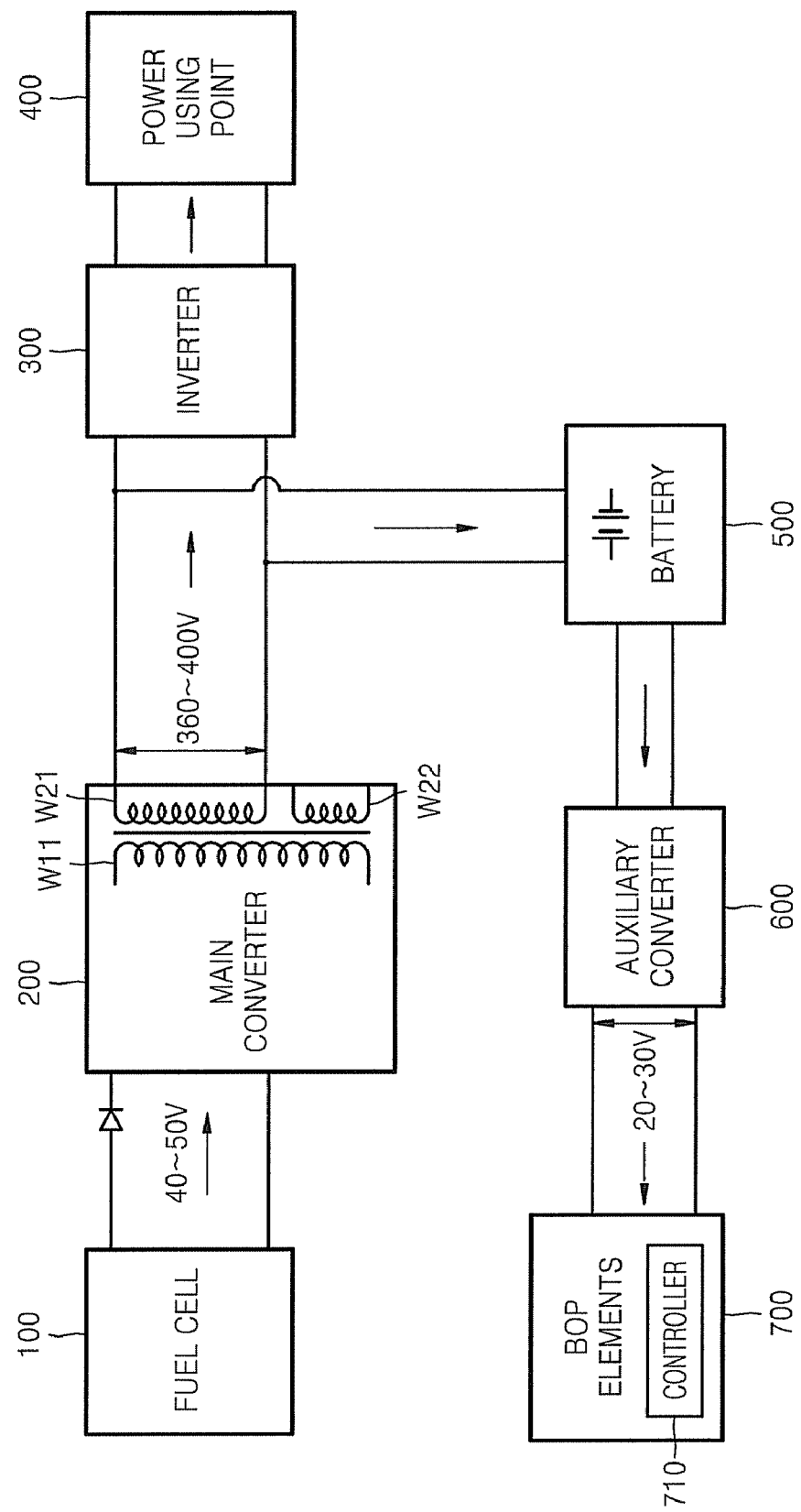
FIG. 3A is a block diagram showing a state of the power conditioner of FIG. 2 during an initial start-up mode according to an aspect of the invention.

First, operation of a stack of the fuel cell 100 constituting a power source is started (S1). However, in the initial start-up mode, a normal voltage is not outputted from the fuel cell 100. At this point, even though power can be supplied to the BOP elements 700 from the second winding W22, since the power is unstable, various driving devices of the stack and the controller 710 cannot be properly operated. A voltage sensor (not shown) in the main converter 200 measures the voltage outputted from the fuel cell 100, and determines whether the voltage outputted from the fuel cell 100 is normal or not (S2). If the outputted voltage from the fuel cell 100 is not normal, the controller 710 turns off the first on/off switch K1 and turns on the second on/off switch K2 (S3) to supply power stored in the battery 500 to the BOP elements 700 through the auxiliary converter 600 (S4). The state of the power conditioner in this case of switch selection is shown in FIG. 3A. That is, until the fuel cell 100 reaches a normal operation state, the power conditioner is operated using the power stored in the battery 500 like in the related art. Also, until the fuel cell 100 reaches a normal operation state, as described above, the power conditioner can be operated by connecting the auxiliary converter 600 to a source of household voltage, such as 110V or 220V, instead of using the battery 500. However, it is understood that the auxiliary converter 600 can be connected to any other suitable external power source.

Figure 3B:
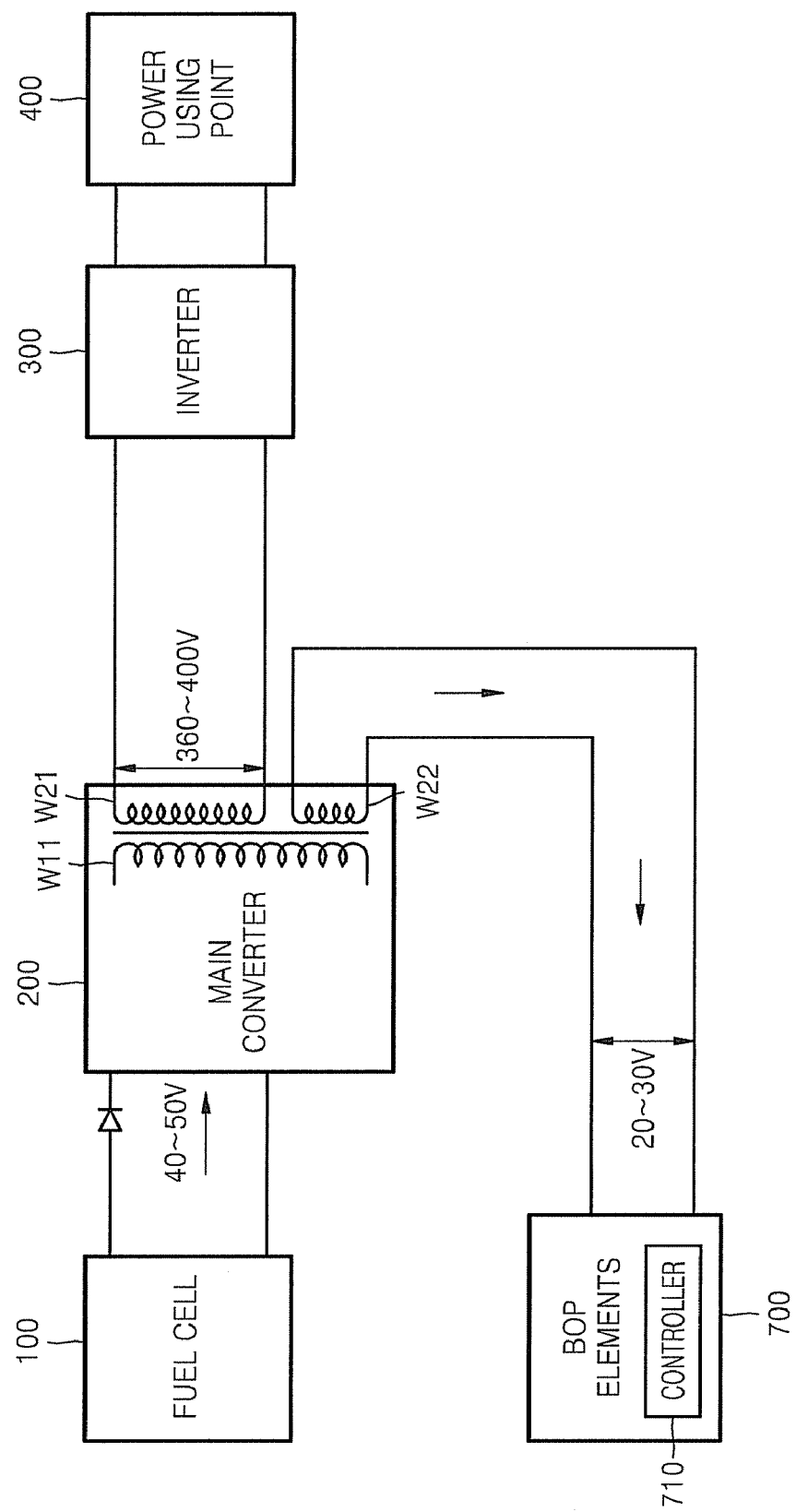
FIG. 3B is a block diagram showing a state of the power conditioner of FIG. 2 during a normal operation mode according to an aspect of the invention.

When power having a stable voltage is outputted from the fuel cell 100 due to the fuel cell 100 reaching the normal operation state, the first on/off switch K1 is turned on and the second on/off switch K2 is turned off (S5). In this case, as shown in FIG. 3B, a voltage reduced by the second winding W22 is supplied to the BOP elements 700 (S6). That is, from this point on, since a stable voltage is being outputted from the fuel cell 100, the voltage reduced by the second winding W22 is stabilized enough to be supplied to the BOP elements 700. Accordingly, since a voltage that has passed through only the main converter 200 is supplied to the BOP elements 700, power loss can be greatly reduced when compared to the related art in which the power supplied to the BOP elements 70 in FIG. 1 must undergo two voltage conversions, i.e. the voltage conversion in the main converter 20 in FIG. 1 and the voltage conversion in the auxiliary converter 60 in FIG. 1.

When it is necessary to shut down the overall system in FIG. 2 including the fuel cell 100 and the power conditioner when the overall system is operating in a normal operation mode, the overall system enters a shutdown mode (S7). In this case, some of the BOP elements 700 are required to continue operating for a predetermined time (S8). At this point, since some power remains in the stack of the fuel cell 100, the remaining power in the stack of the fuel cell 100 can be supplied to the BOP elements 700 through the second winding W22. In this case, the controller 710 also controls the first on/off switch K1 and the second on/off switch K2 to maintain the first on/off switch K1 in an on state and the second on/off switch K2 in an off state.

Thus, a power conditioner that can reduce power loss can be realized by reducing the number of times voltage conversion is performed when power is supplied to the BOP elements 700 in the normal operation mode.

According to aspects of the invention described above, the fuel cell 100 is used as a power source. However, when a solar cell is used as a power source, a power conditioner similar to the one described above can be provided.

Figure 5:
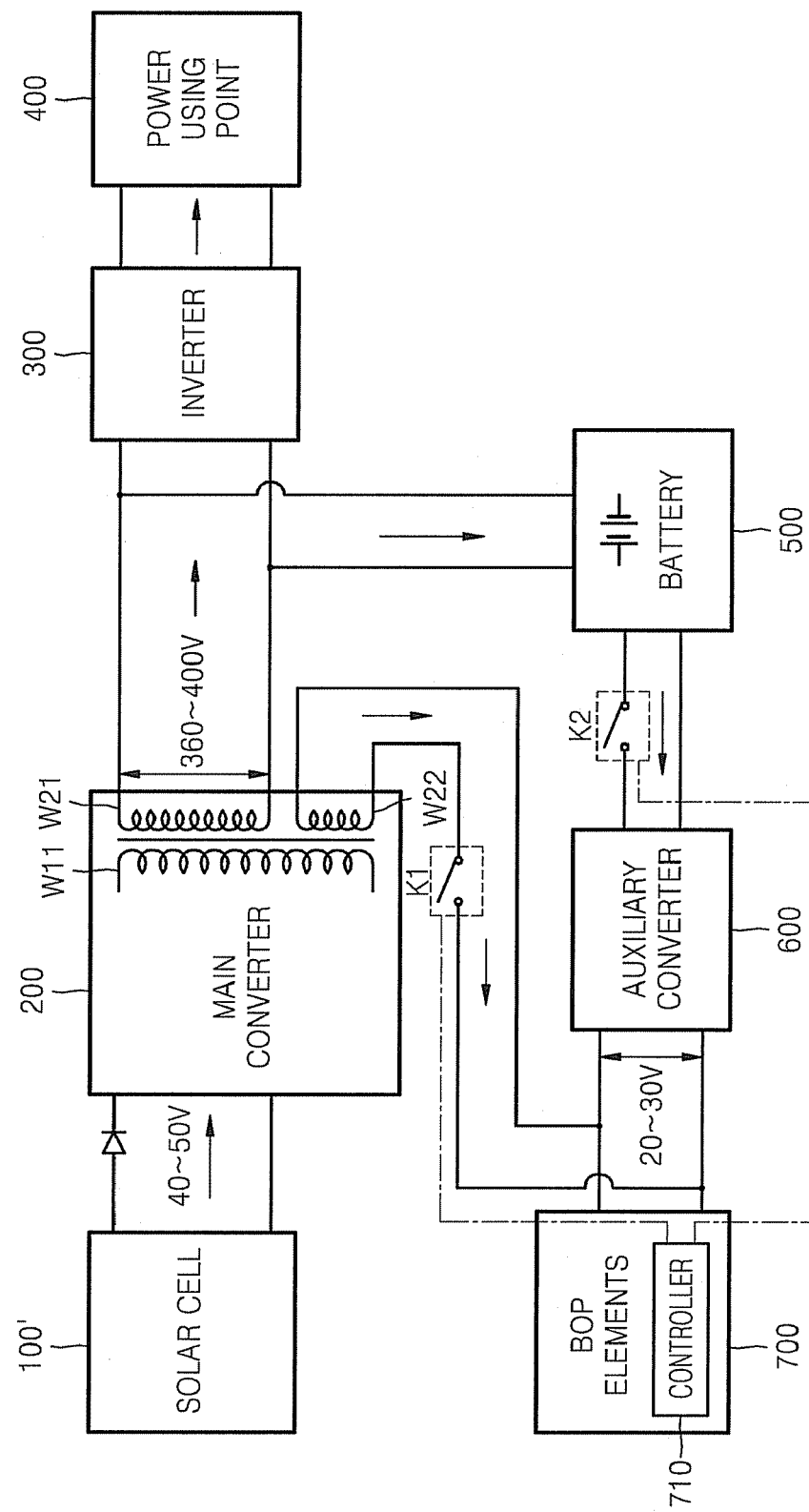
FIG. 5 is a block diagram of another power conditioner according to an aspect of the invention.

FIG. 5 is a block diagram of another power conditioner having a solar cell 100' as a power source according to an aspect of the invention. A voltage outputted from the solar cell 100' is also unstable, for example, during an initial start-up mode like the fuel cell 100 as described above. Thus, until the solar cell 100' reaches a normal operation state, the controller 710 turns off the first on/off switch K1 and turns on the second on/off switch K2 so that power stored in the battery 500 can be supplied to the BOP elements 700 through the auxiliary converter 600. When the solar cell 100' generates power having a stable voltage, the controller 710 turns on the first on/off switch K1 and turns off the second on/off switch K2 to supply power to the BOP elements 700 from the second winding W22. The configuration and operation of the power conditioner according to this aspect of the invention are the same as the power conditioner according to the aspect of the invention shown in FIG. 2, except that the power source is the solar cell 100' instead of the fuel cell 100. Accordingly, according to an aspect of the invention, the power source is not limited to a fuel cell. That is, aspects of the invention can be applied to a power conditioner that uses a solar cell as a power source instead of a fuel cell.

A power conditioner according to an aspect of the invention has at least the following advantages.

First, except in an initial start-up mode, a voltage supplied to the BOP elements is transformed only once, thereby greatly reducing power loss compared to the related art.

Second, a voltage outputted from a power source is not directly supplied to the BOP elements, but is supplied to the BOP elements though a winding provided in a main converter. Thus, a stable voltage can be supplied to the BOP elements regardless of the load variation of power using points.

Third, an auxiliary converter and a battery can be designed to have a small capacity since they are used only in the initial start-up mode.

Although several embodiments of the invention have been shown and described, it would be appreciated by those skilled in the art that changes may be made in these embodiments without departing from the principles and spirit of the invention, the scope of which is defined in the claims and their equivalents.

What is claimed is:

1. A method of operating a power conditioner, the power conditioner comprising:
a main converter comprising a first winding to transform a voltage outputted from a power source into a first transformed voltage and output the first transformed voltage to supply power to a power using point, and a second winding to transform the voltage outputted from the power source into a second transformed voltage and output the second transformed voltage to supply power to a balance-of-plant (BOP) element of the power source, a capacitor connected to the first winding to store power outputted from the first winding and output a voltage, an auxiliary converter connected to the capacitor to transform the voltage outputted from the capacitor into a third transformed voltage to supply power to the BOP element, a first on/off switch in a first power supply line that supplies power to the BOP element from the auxiliary converter, a second on/off switch in a second power supply line that supplies power directly to the BOP element from the second winding, and a controller to control the first on/off switch and the second on/off switch to selectively provide power to the BOP element from the auxiliary converter and the second winding;

the method comprising:

starting the power source;

supplying power to the BOP element only from the auxiliary converter by controlling the first on/off switch and the second on/off switch using the controller when the voltage outputted from the power source is unstable; and supplying power to the BOP element only from the second winding, thereby bypassing the auxiliary converter, by controlling the first on/off and the second on/off switch using the controller when the voltage outputted from the power source is stable.

2. The method of claim 1, further comprising:

shutting down the power source and the power conditioner; and supplying power remaining in the power source to the BOP element only from the second winding, thereby bypassing the auxiliary converter, by controlling the first on/off switch and the second on/off switch using the controller when the BOP element is required to operate during the shutting down of the power source and the power conditioner.

3. The method of claim 1, wherein the power source is a fuel cell or a solar cell.

* * * * *